(12) United States Patent
Bento et al.

(10) Patent No.: US 11,220,592 B2
(45) Date of Patent: Jan. 11, 2022

(54) POLYOLEFIN COMPOSITIONS WITH IMPROVED SOFT TOUCH PROPERTIES

(71) Applicant: Braskem S.A., Camaçari (BR)

(72) Inventors: Leonardo Souza Bento, São Paulo (BR); Augusto Cesar Esteves, São Paulo (BR)

(73) Assignee: Braskem S.A., Camaçari (BR)

( * ) Notice: Subject to any disclaimer, the term of this patent is extended or adjusted under 35 U.S.C. 154(b) by 0 days.

(21) Appl. No.: 16/404,320

(22) Filed: May 6, 2019

(65) Prior Publication Data

US 2019/0367712 A1    Dec. 5, 2019

Related U.S. Application Data

(60) Provisional application No. 62/667,152, filed on May 4, 2018.

(51) Int. Cl.
| | | |
|---|---|---|
| *C08L 23/06* | (2006.01) | |
| *C08K 5/00* | (2006.01) | |
| *C08L 21/00* | (2006.01) | |
| *C08L 23/08* | (2006.01) | |
| *C08L 23/12* | (2006.01) | |

(52) U.S. Cl.
CPC ............ *C08L 23/06* (2013.01); *C08K 5/0016* (2013.01); *C08L 21/00* (2013.01); *C08L 23/0853* (2013.01); *C08L 23/12* (2013.01); *C08L 2205/035* (2013.01); *C08L 2207/04* (2013.01); *C08L 2207/062* (2013.01)

(58) Field of Classification Search
CPC ..... B32B 27/08; B32B 27/32; B32B 2270/00; B32B 2307/30; C08K 5/0016; C08L 21/00; C08L 23/06; C08L 23/0815; C08L 23/0853; C08L 23/12; C08L 2207/04; C08L 2207/062
See application file for complete search history.

(56) References Cited

U.S. PATENT DOCUMENTS

| | | | |
|---|---|---|---|
| 2008/0132595 A1* | 6/2008 | Heck | C08L 23/10 521/144 |
| 2014/0079898 A1* | 3/2014 | Kaushik et al. | C08L 23/0853 428/36.9 |
| 2014/0163446 A1* | 6/2014 | Chatterjee et al. | A61F 13/0206 602/45 |
| 2017/0130101 A1* | 5/2017 | Heimink | B32B 37/12 |

FOREIGN PATENT DOCUMENTS

| | | |
|---|---|---|
| BR | 102012025160-4 A2 | 11/2013 |
| WO | 2014-053037 A1 | 4/2014 |

OTHER PUBLICATIONS https://www.sciencedirect.com/topics/engineering/polymer-molecular-weight#:~:text=If%20all%20polymer%20chains%20are,is%20the%20molecular%20weight%20distribution. (Year: 2020).*
https://www.dow.com/en-us/document-viewer.html?ramdomVar=5875550507609601598&docPath=/content/dam/dcc/documents/en-us/productdatasheet/400-1/400-00071355en-dow-lldpe-dnda1081-nt-7-tds.pdf (Year: 2020).*

* cited by examiner

*Primary Examiner* — Sanza L. McClendon
(74) *Attorney, Agent, or Firm* — Osha Bergman Watanabe & Burton LLP

(57) ABSTRACT

Compositions may include a tactile polymer composition prepared from a mixture of polyolefin and a rubber component, wherein the mixture is prepared in a post-reactor process, and wherein the tactile polymer composition has a complex viscosity at 0.10 rad/s according to ASTM D4440 in the range of 1,000 to 40,000 Pa·s. Methods may include preparing a tactile polymer composition by combining a mixture of polyolefin and a rubber component at elevated temperature to produce a blended polymer composition; wherein the tactile polymer composition has a complex viscosity at 0.10 rad/s according to ASTM D4440 in the range of 1,000 to 40,000 Pa·s.

33 Claims, No Drawings

POLYOLEFIN COMPOSITIONS WITH IMPROVED SOFT TOUCH PROPERTIES

BACKGROUND

Polyolefin copolymers are a manufacturing feedstock that may be used to produce a a varied range of articles, including films, molded products, foams, and the like. In general, polyolefins are widely used plastics worldwide, given their versatility in a wide range of applications. While polyolefins may have characteristics such as high processability, low production cost, flexibility, low density and recycling possibility, physical and chemical properties such as rigidity, poor texture, and lackluster visual qualities of the material may not be ideal for point of sale applications, and uses where enhanced sensorial properties are desired.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to compositions that may include a tactile polymer composition prepared from a mixture of polyolefin and a rubber component, wherein the mixture is prepared in a post-reactor process; and wherein the tactile polymer composition has a complex viscosity at 0.10 rad/s according to ASTM D4440 in the range of 1,000 to 40,000 Pa·s.

In another aspect, embodiments disclosed herein relate to compositions that may include a multilayer article, including: two or more layers, wherein at least one of the layers comprises a tactile polymer composition prepared from a mixture of polyolefin and a rubber component; wherein the tactile polymer composition has a complex viscosity at 0.10 rad/s according to ASTM D4440 in the range of 1,000 to 40,000 Pa·s.

In another aspect, embodiments disclosed herein relate to compositions that may include a blow molded multilayer article, including: two or more layers, wherein the outermost layer comprises a tactile polymer composition prepared from a mixture of polyolefin and a rubber component; wherein the tactile polymer composition has a complex viscosity at 0.10 rad/s according to ASTM D4440 in the range of 1,000 to 40,000 Pa·s.

In another aspect, embodiments disclosed herein relate to methods that may include preparing a tactile polymer composition by combining a mixture of polyolefin and a rubber component at elevated temperature to produce a blended polymer composition; wherein the tactile polymer composition has a complex viscosity at 0.10 rad/s according to ASTM D4440 in the range of 10,000 to 40,000 Pa·s.

Other aspects and advantages of the claimed subject matter will be apparent from the following description and the appended claims.

DETAILED DESCRIPTION

In one aspect, embodiments disclosed herein relate to thermoplastic polymer compositions having enhanced tactile and/or opacity properties. In one or more embodiments, polymer compositions in accordance with the present disclosure include tactile polymers having enhanced sensorial feel and distinct qualities that may enhance visual appeal at point of sale for packaging of various consumer products over that conventional plastics. Tactile polymers may also be used in applications in which increased friction surfaces and slip resistance are desired, such as containers for shower soaps and lotions.

While tactile polymer compositions on the market currently are generated within the reactors, polymer compositions in accordance with the present disclosure may be generated in post-reactor processes. Tactile polymer compositions may be prepared from a polyolefin with a rubber component in a post-reactor melt mixture process, including extruders and intensive mixers. By mixing components subsequent to synthesis in a reactor, each component isolated may be combined in controlled stoichiometry to generate polymer composition while minimizing the presence of reactants and degradation products. For multicomponent compositions, a subset of the components may be combined by melt mixing followed by subsequent mixing steps, or all components may be melt mixed simultaneously.

In one or more embodiments, polymer compositions may be incorporated into multilayer packaging. In some embodiments, multilayer packages may contain 3 layers, wherein the intermediate layer is produced with a tactile polymer composition of the present invention. In this embodiment, the package would have a foam-like sensation to the touch, giving the appearance that the package's walls are not hard to the touch.

As mentioned, embodiments of the present disclosure are directed to polymer compositions containing polyolefins and a rubber (or elastomeric) component. The rubber (or elastomeric) component may be a single- or multi-component composition which exhibits rubber-like or elastomeric properties. For example, the polymer compositions of the present disclosure may include, in addition to polyolefin, an ethylene vinyl-acetate copolymer (EVA) rubber resin, rubber (such as in combination also with an EVA component), or ethylene propylene diene monomer (EPDM) rubber or a thermoplastic elastomer. Each of these are discussed in turn.

Polyolefin

Polymer compositions in accordance with the present disclosure may include polyolefins. In one or more embodiments, polyolefins include polymers produced from unsaturated monomers (olefins or "alkenes") with the general chemical formula of $C_nH_{2n}$. In some embodiments, polyolefins may include ethylene homopolymers, copolymers of ethylene and one or more C3-C20 alpha-olefins, propylene homopolymers, heterophasic propylene polymers, copolymers of propylene and one or more comonomers selected from ethylene and C4-C20 alpha-olefins, olefin terpolymers and higher order polymers, and blends obtained from the mixture of one or more of these polymers and/or copolymers. In some embodiments, polyolefins may be generated with a suitable catalyst such as Ziegler, metallocene, and chromium catalysts.

In one or more embodiments, polyolefins are selected from polyethylene, polypropylene and combinations thereof. In one or more embodiments, polyethylenes may include polyethylenes having a monomodal, bimodal, trimodal or multimodal molecular weight distribution.

Polyolefins in accordance with the present disclosure may have a Mw/Mn ranging from a lower limit selected from any of 1, 2, 5 and 10 to an upper limit selected from any of 20, 30, and 50, where any lower limit may be paired with any upper limit.

Polyolefins in accordance with the present disclosure may have a number average molecular weight ($M_n$) ranging from a lower limit selected from any of 2, kDa, 4 kDa, 5 kDa, and 6 kDa, to an upper limit selected from any of 20 kDa, 50 kDa, and 60 kDa, where any lower limit may be paired with any upper limit.

Polyolefins in accordance with the present disclosure may have a z-average molecular weight ($M_z$) ranging from a lower limit selected from any of 50 kDa, 100 kDa, and 200 kDa, to an upper limit selected from any of 100 kDa, 400 kDa, 500 kDa, 1,000 kDa and 1,500 kDa where any lower limit may be paired with any upper limit.

Polyolefins in accordance with the present disclosure may have a weight average molecular weight ($M_w$) ranging from a lower limit selected from any of 40 kDa, 50 kDa, and 60 kDa, to an upper limit selected from any of 200 kDa, 500 kDa, and 600 kDa, where any lower limit may be paired with any upper limit.

Molecular weight analysis is carried out by gel permeation chromatography (GPC). In one or more embodiments, the GPC experiments may be carried out by gel permeation chromatography coupled with triple detection, with an infrared detector IR5 and a four-bridge capillary viscometer (PolymerChar) and an eight-angle light scattering detector (Wyatt). A set of 4 mixed bed, 13 m columns (Tosoh) may be used at a temperature of 140° C. The experiments may use a concentration of 1 mg/mL, a flow rate of 1 mL/min, a dissolution temperature and time of 160° C. and 90 minutes, respectively, an injection volume of 200 µL, and a solvent of trichlorium benzene stabilized with 100 ppm of BHT.

Polyolefins may be monomodal or multimodal compositions. As used herein, "modality" of a polymer may refer to the shape of a molecular weight distribution for a population of polymer molecules in a polymer sample. The rate of chain propagation in a polymerization is not uniform and, as a result, distributions of molecular weights will exist in a polymer sample obtained from a reactor. For polymer samples prepared by combining multiple polymer samples, or for samples originating from a multi-step synthesis, the different polymer fractions will have distinct molecular weight distributions, which will be present as multiple maxima or a broadened peak. As used herein "multimodal" refers to a polyolefin composition exhibiting two or more distinct peaks within the molecular weight distribution.

In one or more embodiments, multimodal polyolefin compositions may include a low molecular weight (LMW) fraction and a high molecular weight (HMW) fraction. In some embodiments, the weight ratio of the LMW fraction and the HMW fraction may range from a lower limit selected from any of 20:80, 40:60, and 50:50, to an upper limit selected from any of 55:45, 60:40, and 80:20. In one or more embodiments, multimodal polyolefin compositions may be prepared in two or more reactors connected in series or in parallel, wherein a low molecular weight fraction may be prepared in one reactor and a high molecular weight fraction may be prepared in another reactor.

In one or more embodiments, polyolefins include polyethylene, including ethylene homopolymer and/or ethylene copolymers with one or more C3-C20 alpha-olefins, and combinations thereof.

In one or more embodiments, polyethylene may include polyethylene generated from petroleum based monomers and/or biobased monomers, such as ethylene obtained by the dehydration of biobased alcohols obtained from sugarcane. Commercial examples of biobased polyethylenes are the "I'm Green"™ line of bio-polyethylenes from Braskem S.A.

Polyethylenes in accordance with the present disclosure may have a density as determined according to ASTM D 792 in a range having a lower limit selected from any of 0.910 g/cm$^3$, 0.920 g/cm$^3$, and 0.940 g/cm$^3$, to an upper limit selected from any of 0.950 g/cm$^3$, 0.960 g/cm$^3$, and 0.970 g/cm$^3$, where any lower limit may be combined with any upper limit.

Polyethylenes in accordance with the present disclosure may have a melt flow index according to ASTM D1238 at 190° C./2.16 kg (12) in a range having a lower limit selected from any of 0.01 g/10 min, 0.1 g/10 min, and 1 g/10 min, to an upper limit selected from any of 8 g/10 min, 30 g/10 min, and 60 g/10 min, where any lower limit may be paired with any upper limit.

Polyethylenes in accordance with the present disclosure may have a high load melt index (HLMI) according to ASTM D1238 at 190° C./21.6 kg in a range having a lower limit selected from any of 0.1 g/10 min, 1.0 g/10 min, 5 g/10 min and 15 g/10 min to an upper limit selected from any of 35 g/10 min, 60 g/10 min, and 80 g/10 min, where any lower limit may be paired with any upper limit.

Polyethylenes in accordance with the present disclosure may have a secant modulus at 1% according to ASTM D882 in a range having a lower limit selected from any of 50 MPa, 100 MPa, and 150 MPa, to an upper limit selected from any of 2,000 MPa, 2,500 MPa, and 3,000 MPa, where any lower limit may be paired with any upper limit.

Polyethylenes in accordance with the present disclosure may have a breaking strength according to ASTM D882 in a range having a lower limit selected from any of 10 MPa, 20 MPa, and 30 MPa, to an upper limit selected from any of 400 MPa, 500 MPa, and 600 MPa, where any lower limit may be paired with any upper limit.

In one or more embodiments, polyethylenes may have a bimodal molecular weight distribution comprising a low molecular weight fraction and a high molecular weight fraction, wherein the low molecular weight fraction may have a density as determined according to ASTM D 792 in a range having a lower limit selected from any of 0.955 g/cm$^3$, 0.960 g/cm$^3$ and 0.965 g/cm$^3$ to an upper limit selected from any of 0.965 g/cm$^3$, 0.970 g/cm$^3$ and 0.975 g/cm$^3$, where any lower limit may be combined with any upper limit. In other embodiments, the low molecular weight fraction may have a melt flow index according to ASTM D1238 at 190° C./5.0 kg ($I_5$) in a range having a lower limit selected from any of 20 g/10 min, 25 g/10 min, 30 g/10 min, and 35 g/10 min, to an upper limit selected from any of 50 g/10 min, 60 g/10 min, 65 g/10 min, and 75 g/10 min, where any lower limit may be paired with any upper limit.

In one or more embodiments, polyethylenes may have an IZOD impact strength at 23° C. according to ASTM D256 that ranges from 1 J/m to no break (NB).

In one or more embodiments, polymer compositions may include polypropylene homopolymers and/or polypropylene copolymers or mixtures thereof prepared with one or more C4-C20 olefin comonomers. In some embodiments, polypropylenes include heterophasic polypropylenes copolymers (HECO). Polypropylenes in accordance with the present disclosure may include heterophasic copolymers having an internal polymer phase at a weight percent (wt %) of the heterophasic copolymer in a range having a lower limit selected from any of 1 wt %, 5 wt %, 10 wt %, and 20 wt %, to an upper limit selected from any of 30 wt %, 40 wt % and 50 wt % where any lower limit may be paired with any upper limit. In some embodiments, the internal phase (rubber phase) of the heterophasisc copolymer may include ethylene copolymer. In an embodiment, the ethylene content of the rubber phase in the heterophasic copolymer, measured according to ASTM D7399, may range from a lower limit selected from 10 wt %, 30 wt %, 40 wt % and 45 wt % to an upper limit selected from 50 wt %, 60 wt % and 70 wt % of the rubber phase in the heterophasic copolymer, where any lower limit may be paired with any upper limit.

Polypropylenes in accordance with the present disclosure may have a fraction of solubles in xylene according to ASTM D5492 in a range having a lower limit selected from any of 1.0 wt. %, 1.3 wt. %, and 1.5 wt. %, to an upper limit selected from any of 44 wt. %, 45 wt. %, and 46 wt. %, where any lower limit may be paired with any upper limit.

Polypropylenes in accordance with the present disclosure may have a crystallinity according to ASTM D3417 in a range having a lower limit selected from any 30%, 40%, and 50%, to an upper limit selected from any of 50%, 60%, and 70%, where any lower limit may be paired with any upper limit.

Polypropylenes in accordance with the present disclosure may have a melt flow index (MFI) according to ASTM D1238 at 230° C./2.16 kg in a range having a lower limit selected from any of 0.1 g/10 min, 1 g/10 min, 50 g/10 min, and 100 g/10 min, to an upper limit selected from any of 200 g/10 min, 500 g/10 min, 1,000 g/10 min and 1,500 g/10 min, where any lower limit may be paired with any upper limit.

Polypropylenes in accordance with the present disclosure may have a density according to ASTM D1505/D792 in a range having a lower limit selected from any of 0.85 g/cm$^3$, 0.89 g/cm$^3$, and 0.90 g/cm$^3$, to an upper limit selected from any of 0.90 g/cm$^3$, 0.91 g/cm$^3$, and 0.95 g/cm$^3$, where any lower limit may be paired with any upper limit.

Rubber Component

As mentioned, above, the polymer compositions of the present disclosure may include a rubber (or elastomeric component) therein in combination with the above described polyolefin. The rubber (or elastomeric) component may be a single- or multi-component composition which exhibits rubber-like or elastomeric properties. In particular embodiments, for example, the rubber (or elastomeric) component may be selected from an ethylene vinyl-acetate copolymer (EVA) rubber resin, rubber (such as in combination also with an EVA component), or ethylene propylene diene monomer (EPDM) rubber or a thermoplastic elastomer.

Ethylene Vinyl Acetate Rubber

Polymer compositions in accordance to the present disclosure may include an ethylene vinyl acetate (EVA) rubber resin prepared from of (A) EVA copolymer, (B) ethylene alpha-olefin copolymer, (C) polyorganosiloxane, (D) plasticizer, and (E) rubber. EVA rubber compositions are prepared as disclosed in the Brazilian patent BR102012025160-4, incorporated herein by reference in its entirety. The major components of the elastomer composition of the present disclosure as well as their respective properties are detailed below. EVA rubber resins may be selected from commercially available resins by Braskem such as VA4018R, VA1518A, VA2510R, VA5018ALS, SVT2145R, and combinations thereof.

(A) EVA Copolymer

EVA rubber compositions in accordance may incorporate one or more EVA copolymers prepared by the copolymerization of ethylene and vinyl acetate. In some embodiments, the EVA copolymer can be derived from fossil or renewable sources such as biobased EVA. Biobased EVA is an EVA wherein at least one of ethylene and/or vinyl acetate monomers are derived from renewable sources, such as ethylene derived from biobased ethanol.

EVA copolymers in accordance with the present disclosure may include a percent by weight (wt %) of vinyl acetate content as determined by ASTM D5594 that ranges from a lower limit selected from one of 8 wt %, 12 wt %, and 18 wt % to an upper limit selected from 28 wt %, 33 wt %, and 40 wt %, where any lower limit may be paired with any upper limit.

EVA copolymer in accordance with the present disclosure may include a percent by weight (wt %) of ethylene that ranges from a lower limit selected from one of 60 wt %, 66 wt %, and 72 wt %, to an upper limit selected from one of 82 wt %, 88 wt %, and 92 wt %, where any lower limit may be paired with any upper limit.

EVA copolymer in accordance with the present disclosure may have a melt flow index at 190° C. and 2.16 kg (I2) as determined according to ASTM D1238 in a range having a lower limit selected from any of 1 g/10 min, 2 g/10 min, 3 g/10 min, and 4 g/10 min to an upper limit selected from any of 10 g/10 min, 20 g/10 min, 30 g/10 min, and 45 g/10 min where any lower limit may be paired with any upper limit.

EVA copolymer in accordance with the present disclosure may have a density determined according to ASTM D792 in a range having a lower limit selected from any of 0.80 g/cm$^3$, 0.85 g/cm$^3$, and 0.90 g/cm$^3$, to an upper limit selected from any of 0.93 g/cm$^3$, 0.94 g/cm$^3$, and 0.98 g/cm$^3$, where any lower limit may be paired with any upper limit.

EVA rubber compositions in accordance with the present disclosure may contain an EVA copolymer at a percent by weight (wt %) of the composition that ranges from a lower limit of 20 wt % or 50 wt %, to an upper limit of 80 wt % or 90 wt %, where any lower limit may be paired with any upper limit.

(B) Ethylene Alpha-Olefin Copolymer

EVA rubber compositions in accordance may incorporate one or more copolymers prepared from the polymerization of ethylene and a C3 to C20 alpha-olefin.

Ethylene alpha-olefin copolymer in accordance with the present disclosure may have a hardness determined in accordance with ASTM D2240 in a range having a lower limit selected from any of 10 Shore A, 15 Shore A, and 20 Shore A, to an upper limit selected from any of 70 Shore A, 75 Shore A, and 80 Shore A, where any lower limit may be paired with any upper limit.

Ethylene alpha-olefin copolymer in accordance with the present disclosure may have a density determined according to ASTM D792 in a range having a lower limit selected from any of 0.80 g/cm$^3$, 0.85 g/cm$^3$, and 0.88 g/cm$^3$, to an upper limit selected from any of 0.89 g/cm$^3$, 0.90 g/cm$^3$, and 0.95 g/cm$^3$, where any lower limit may be paired with any upper limit.

Ethylene alpha-olefin copolymer in accordance with the present disclosure may have a melt flow index at 190° C. and 2.16 kg (I2) as determined according to ASTM D1238 in a range having a lower limit selected from any of 0.01 g/10 min, 0.05 g/10 min, and 0.1 g/10 min, to an upper limit selected from any of 70 g/10 min, 75 g/10 min, and 100 g/10 min, where any lower limit may be paired with any upper limit.

EVA rubber compositions in accordance with the present disclosure may contain an ethylene alpha-olefin copolymer at a percent by weight (wt %) of the composition that ranges from a lower limit of 5 wt % or 10 wt %, to an upper limit of 30 wt % or 60 wt %, where any lower limit may be paired with any upper limit.

(C) Polyorganosiloxane

EVA rubber compositions in accordance may incorporate a polyorganosiloxane. In one or more embodiments, suitable polyorganosiloxanes include a linear chain, branched, or three-dimensional structure, wherein the side groups can include one or more of methyl, ethyl, propyl groups, vinyl, phenyl, hydrogen, amino, epoxy, or halogen substituents.

The terminal groups of the polyorganosiloxane may include hydroxyl groups, alkoxy groups, trimethylsilyl, dimethyldiphenylsilyl, and the like. Polyorganosiloxanes in accordance with the present disclosure may include one or more of dimethylpolysiloxane, methylpolysiloxane, and the like.

EVA rubber compositions in accordance with the present disclosure may contain a polyorganosiloxane having a viscosity measured at 25° C. according to ASTM D4287 that ranges from a lower limit of 20 cP or 40 cP, to an upper limit of 700,000 cP or 900,000 cP, where any lower limit may be paired with any upper limit.

EVA rubber compositions in accordance with the present disclosure may contain a polyorganosiloxane at a percent by weight (wt %) of the composition that ranges from a lower limit of 0.1 wt % or 0.5 wt %, to an upper limit of 5 wt % or 10 wt %, where any lower limit may be paired with any upper limit.

(D) Plasticizer

EVA rubber compositions in accordance may incorporate a plasticizer to improve the processability and adjust the hardness of the EVA rubber. Plasticizers in accordance with the present disclosure may include one or more of bis(2-ethylhexyl) phthalate (DEHP), di-isononyl phthalate (DINP), bis (n-butyl) phthalate (DNBP), butyl benzyl phthalate (BZP), di-isodecyl phthalate (DIDP), di-n-octyl phthalate (DOP or DNOP), di-o-octyl phthalate (DIOP), diethyl phthalate (DEP), di-isobutyl phthalate (DIBP), di-n-hexyl phthalate, trimethyl trimellitate (TMTM), tri-(2-ethylhexyl) trimellitate (TEHTM-MG), tri-(n-octyl, n-decyl) trimellitate, tri-(heptyl, nonyl) trimellitate, n-octyl trimellitate, bis (2-ethylhexyl) adipate (DEHA), dimethyl adipate (DMD), mono-methyl adipate (MMAD), dioctyl adipate (DOA)), dibutyl sebacate (DBS), polyesters of adipic acid such as VIERNOL, dibutyl maleate (DBM), di-isobutyl maleate (DIBM), benzoates, epoxidized soybean oils, n-ethyl toluene sulfonamide, n-(2-hydroxypropyl) benzene sulfonamide, n-(n-butyl) benzene sulfonamide, tricresyl phosphate (TCP), tributyl phosphate (TBP), glycols/polyesters, triethylene glycol dihexanoate, 3 gh), tetraethylene glycol diheptanoate, polybutene, acetylated monoglycerides; alkyl citrates, triethyl citrate (TEC), acetyl triethyl citrate, tributyl citrate, acetyl tributyl citrate, trioctyl citrate, acetyl trioctyl citrate, trihexyl citrate, acetyl trihexyl citrate, butyryl trihexyl citrate, trihexyl o-butyryl citrate, trimethyl citrate, alkyl sulfonic acid phenyl ester, 2-cyclohexane dicarboxylic acid di-isononyl ester, nitroglycerin, butanetriol trinitrate, dinitrotoluene, trimethylolethane trinitrate, diethylene glycol dinitrate, triethylene glycol dinitrate, bis (2,2-dinitropropyl) formal, bis (2,2-dinitropropyl) acetal, 2,2,2-trinitroethyl 2-nitroxyethyl ether, mineral oils, among other plasticizers and polymeric plasticizers.

EVA rubber compositions in accordance with the present disclosure may contain a plasticizer at a percent by weight (wt %) of the composition that ranges from a lower limit of 0.5 wt % or 2 wt %, to an upper limit of 10 wt % or 20 wt %, where any lower limit may be paired with any upper limit.

(E) Rubber

EVA rubber compositions in accordance may incorporate a rubber to increase the rubbery touch and increase the coefficient of friction, depending on the end application. Rubbers in accordance with the present disclosure may include one or more of natural rubber, poly-isoprene (IR), styrene and butadiene rubber (SBR), polybutadiene, nitrile rubber (NBR); polyolefin rubbers such as ethylene-propylene rubbers (EPDM, EPM), and the like, acrylic rubbers, halogen rubbers such as halogenated butyl rubbers including brominated butyl rubber and chlorinated butyl rubber, brominated isobutylene, polychloroprene, and the like; silicone rubbers such as methylvinyl silicone rubber, dimethyl silicone rubber, and the like, sulfur-containing rubbers such as polysulfidic rubber; fluorinated rubbers; thermoplastic rubbers such as elastomers based on styrene, butadiene, isoprene, ethylene and propylene, styrene-isoprene-styrene (SIS), styrene-ethylene-butylene-styrene (SEBS), styrene-butylene-styrene (SBS), and the like, ester-based elastomers, elastomeric polyurethane, elastomeric polyamide, and the like.

Rubbers in accordance with the present disclosure may have a hardness determined in accordance with ASTM D2240 in a range having a lower limit selected from any of 10 Shore A, 15 Shore A, and 20 Shore A, to an upper limit selected from any of 45 Shore A, 50 Shore A, and 55 Shore A, where any lower limit may be paired with any upper limit.

EVA rubber compositions in accordance with the present disclosure may contain a rubber at a percent by weight (wt %) of the composition that ranges from a lower limit of 0.5 wt % or 1 wt %, to an upper limit of 20 wt % or 40 wt %, where any lower limit may be paired with any upper limit.

In one or more embodiments, the EVA rubber composition may have a melt flow index at 190° C. and 2.16 kg (12) as determined according to ASTM D1238 in a range having a lower limit selected from any of 4 g/10 min, 5 g/10 min, 5.5 g/10 min, and 10 g/10 min, to an upper limit selected from any of 10 g/10 min, 20 g/10 min, 30 g/10 min, and 43 g/10 min, where any lower limit may be paired with any upper limit.

In one or more embodiments, the EVA rubber has a density determined according to ASTM D792 in a range having a lower limit selected from any of 0.9 g/cm$^3$, 0.91 g/cm$^3$, 0.92 and g/cm$^3$, to an upper limit selected from any of 0.93 g/cm$^3$, 0.94 g/cm$^3$, 0.95 g/cm$^3$, and 0.98 g/cm$^3$, where any lower limit may be paired with any upper limit.

Thermoplastic Ethylene Vinyl Acetate+Rubber

In one or more embodiments, polymer compositions in accordance with the present disclosure may include a mixture of polyolefin, rubber (selected from those described below), and thermoplastic ethylene vinyl acetate (TEVA) copolymer. In some embodiments, TEVA copolymers may incorporate various ratios of ethylene and vinyl acetate, in addition to including one or more additional comonomers.

In some embodiments, the TEVA can be derived from fossil or renewable sources. Bio-based TEVA is a TEVA wherein at least one of ethylene and/or vinyl acetate monomers are derived from renewable sources, such as ethylene derived from biobased ethanol. In some embodiments, EVA resins may be selected from commercially available resins by Braskem such as HM728, 3019PE, 8019PE, PN2021, HM150, HM2528, SVT2180 and combinations thereof.

Polymer compositions in accordance with the present disclosure may include a TEVA polymer at a percent by weight of the composition that ranges from a lower limit selected from one of 20 wt %, 55 wt %, 60 wt %, 70 wt % and 89 wt % to an upper limit selected from 80 wt %, 90 wt %, 91 wt %, 95 wt % and 99 wt %, where any lower limit may be paired with any upper limit.

Polymer compositions in accordance with the present disclosure may include an TEVA polymer, wherein the percent by weight of vinyl acetate in the TEVA polymer ranges from a lower limit selected from one of 8 wt %, 12 wt %, and 18 wt % to an upper limit selected from 28 wt %, 33 wt %, and 40 wt %, where any lower limit may be paired with any upper limit.

Polymer compositions in accordance with the present disclosure may include an TEVA polymer, wherein the number average molecular weight ($M_n$) in kilodaltons (kDa) of the TEVA polymer ranges from a lower limit selected from one of 5 kDa, 10 kDa, 20 kDa and 25 kDa to an upper limit selected from one of 30 kDa, 35 kDa, 40 kDa and 50 kDa, where any lower limit may be paired with any upper limit, measured by gel permeation chromatography (GPC).

Polymer compositions in accordance may incorporate a rubber in combination with the TEVA polymer to increase the rubbery touch and increase the coefficient of friction, depending on the end application. Rubbers in accordance with the present disclosure may include one or more of natural rubber, poly-isoprene (IR), styrene and butadiene rubber (SBR), polybutadiene, nitrile rubber (NBR), acrylic rubbers, halogen rubbers such as halogenated butyl rubbers including brominated butyl rubber and chlorinated butyl rubber, brominated isobutylene, polychloroprene, and the like; silicone rubbers; sulfur-containing rubbers such as polysulfidic rubber; fluorinated rubbers; ester-based elastomers, elastomeric polyurethane, elastomeric polyamide; methylvinyl silicone rubber, dimethyl silicone rubber, styrene-isoprene-styrene (SIS), styrene-ethylene-butylene-styrene (SEBS), styrene-butylene-styrene (SBS) and the like.

Rubbers in accordance with the present disclosure may have a hardness determined in accordance with ASTM D2240 in a range having a lower limit selected from any of 10 Shore A, 15 Shore A, and 20 Shore A, to an upper limit selected from any of 45 Shore A, 50 Shore A, and 70 Shore A, where any lower limit may be paired with any upper limit.

Thermoplastic Elastomers

Polymer compositions in accordance with the present disclosure may incorporate a thermoplastic elastomer component. Thermoplastic elastomers in accordance with the present disclosure may include one or more of polyolefin rubbers such as ethylene-propylene rubbers (EPDM, EPM), thermoplastic rubbers such as elastomers based on styrene, butadiene, isoprene, ethylene and propylene, and combinations thereof.

Formulation of Tactile Polymer Compositions

In one or more embodiments, polymer compositions in accordance with the present disclosure prepared from a mixture of polyolefin and EVA rubber resin. In some embodiments polymer compositions may contain a percent by weight of the total composition (wt %) of polyolefin that ranges from a lower limit selected from one of 5 wt %, 10 wt %, 15 wt % and 20 wt % to an upper limit selected from one of 30 wt %, 50 wt %, 80 wt % and 99 wt %, where any lower limit can be used with any upper limit. In some embodiments, polymer compositions may contain a percent by weight of the total composition (wt %) of EVA rubber that ranges from a lower limit selected from one of 5 wt %, 10 wt %, 15 wt % and 20 wt % to an upper limit selected from one of 30 wt %, 50 wt %, 80 wt % and 99 wt %, where any lower limit can be used with any upper limit.

In one or more embodiments, polymer compositions in accordance with the present disclosure prepared from a mixture of polyolefin, TEVA, and a rubber. In some embodiments polymer compositions may contain a percent by weight of the total composition (wt %) of polyolefin that ranges from a lower limit selected from one of 20 wt %, 30 wt %, 40 wt % and 50 wt % to an upper limit selected from one of 55 wt %, 70 wt %, 80 wt % and 99 wt %, where any lower limit can be used with any upper limit. In some embodiments, polymer compositions may contain a percent by weight of the total composition (wt %) of TEVA that ranges from a lower limit selected from one of 10 wt %, 20 wt %, and 25 wt % to an upper limit selected from one of 30 wt %, 40 wt %, 50 wt %, and 60 wt %, where any lower limit can be used with any upper limit. In some embodiments, polymer compositions may contain a percent by weight of the total composition (wt %) of rubber that ranges from a lower limit selected from one of 10 wt %, 15 wt %, and 20 wt % to an upper limit selected from one of 25 wt %, 30 wt %, and 40 wt %, where any lower limit can be used with any upper limit.

In one or more embodiments, polymer compositions in accordance with the present disclosure prepared from a mixture of polyolefin and a thermoplastic elastomer. In some embodiments polymer compositions may contain a percent by weight of the total composition (wt %) of polyolefin that ranges from a lower limit selected from one of 10 wt %, 20 wt %, 40 wt % and 50 wt % to an upper limit selected from one of 40 wt %, 50 wt %, 60 wt % and 70 wt %, where any lower limit can be used with any upper limit. In some embodiments, polymer compositions may contain a percent by weight of the total composition (wt %) of thermoplastic elastomer that ranges from a lower limit selected from one of 30 wt %, 50 wt %, and 60 wt % to an upper limit selected from one of 50 wt %, 70 wt %, and 90 wt %, where any lower limit can be used with any upper limit.

Additives

Polymer compositions in accordance with the present disclosure may include fillers and additives that modify various physical and chemical properties when added to the polymer composition during blending that include one or more polymer additives such as kickers, processing aids, lubricants, antistatic agents, clarifying agents, nucleating agents, beta-nucleating agents, slipping agents, antioxidants, antacids, light stabilizers such as HALS, IR absorbers, whitening agents, organic and/or inorganic dyes, anti-blocking agents, processing aids, flame-retardants, plasticizers, biocides, and adhesion-promoting agents.

Polymer compositions in accordance with the present disclosure may include one or more inorganic fillers such as talc, glass fibers, marble dust, cement dust, clay, carbon black, feldspar, silica or glass, fumed silica, silicates, calcium silicate, silicic acid powder, glass microspheres, mica, metal oxide particles and nanoparticles such as magnesium oxide, antimony oxide, zinc oxide, inorganic salt particles and nanoparticles such as barium sulfate, wollastonite, alumina, aluminum silicate, titanium oxides, calcium carbonate, polyhedral oligomeric silsesquioxane (POSS).

In one or more embodiments, polymer compositions in accordance with the present disclosure may contain a percent by weight of the total composition (wt %) of one or more fillers or additives that ranges from a lower limit selected from one of 0.02 wt %, 0.05 wt %, 0.1 wt %, 0.15 wt %, 0.5 wt %, 0.6 wt %, 0.75 wt %, and 1 wt %, to an upper limit selected from one of 0.3 wt %, 0.6 wt %, 1.25 wt %, 2 wt %, 4 wt %, 5 wt % and 10 wt % where any lower limit can be used with any upper limit.

Polymer Composition Preparation Methods

Polymer compositions in accordance with the present disclosure may be combined using any post-reactor melt mixture process, including extrusion processes with a single, double, or multi-screw extruder. By mixing components subsequent to synthesis, each component may be purified to specified standards and then combined to generate the final composition while minimizing the presence of reactants and degradation products. In embodiments prepared from multiple components, a subset of the components may be combined by melt mixing followed by subsequent mixing steps, or all components may be melt mixed simultaneously.

In one or more embodiments, polymer compositions in accordance with the present disclosure may be prepared using continuous or discontinuous extrusion processes. Methods may use single-, twin- or multi-screw extruders, which may be used at temperatures ranging from 70° C. to 270° C. in some embodiments, and from 110° C. to 230° C. in some embodiments. In one or more embodiments, methods of preparing polymer compositions may involve a single extrusion or multiple extrusions in which components may be simultaneously or separately added. In some embodiments, raw materials are added to an extruder into the main or secondary feeder in the form of powder, granules, flakes or dispersion in liquids as solutions, emulsions and suspensions of one or more components.

Prior to addition to an extruder, polymer composition components may be pre-dispersed using intensive mixers or the like. Inside the extrusion equipment, components may be heated by heat exchange and/or mechanical friction, which may induce phase melting and dispersion by the deformation of the polymer. In some embodiments, one or more compatibilizing agents may be used to facilitate and/or refine the distribution of the polymer phases between insoluble or poorly soluble polymer mixtures and to enable the formation of the morphology of conventional blend and/or of semi-interpenetrating network at the interface between the phases.

Physical Properties of Tactile Polymer Compositions

When the polymer composition includes a polyethylene, the polymer compositions in accordance with the present disclosure may have a melt flow index according to ASTM D1238 at 190° C./2.16 kg (12) in a range having a lower limit selected from any of 0.1 g/10 min, 0.20 g/10 min, 0.30 g/10 min, 0.55 g/10 min, and 0.8 g/10 min to an upper limit selected from any of 0.8 g/10 min, 0.9 g/10 min, 1 g/10 min, 2.5 g/10 min, and 5 g/10 min where any lower limit may be paired with any upper limit.

When the polymer composition includes a polypropylene, the polymer compositions in accordance with the present disclosure may have a melt flow index (MFI) according to ASTM D1238 at 230° C./2.16 kg in a range having a lower limit selected from any of 0.5 g/10 min, 1 g/10 min, 20 g/10 min, and 40 g/10 min, to an upper limit selected from any of 50 g/10 min, 60 g/10 min, 80 g/10 min, 100 g/10 min where any lower limit may be paired with any upper limit.

When the polymer composition includes an EVA rubber or a TEVA, the polymer compositions in accordance with the present disclosure may have an acetate concentration as percent by weight (wt %) of total composition in a range having a lower limit selected from any of 1 wt %, 8 wt %, and 10 wt %, to an upper limit selected from any of 10 wt %, 15 wt %, and 35 wt %, where any lower limit may be paired with any upper limit.

Polymer compositions in accordance with the present disclosure may have a complex viscosity at 0.10 rad/s according to ASTM D4440 in a range having a lower limit selected from any of 1,000 Pa·s, 5,000 Pa·s, 8,000 Pa·s, 10,000 Pa·s, and 18,000 Pa·s, to an upper limit selected from any of 28,000 Pa·s, 32,000 Pa·s, and 40,000 Pa·s, where any lower limit may be paired with any upper limit.

Polymer compositions in accordance with the present disclosure may have a complex viscosity at 100 rad/s according to ASTM D4440 in a range having a lower limit selected from any of 300 Pa·s, 400 Pa·s, 600 Pa·s, and 800 Pa·s, to an upper limit selected from any of 1,000 Pa·s, 1,200 Pa·s, and 1,500 Pa·s, where any lower limit may be paired with any upper limit.

Polymer compositions in accordance with the present disclosure may have a breaking strength according to ASTM D882 in a range having a lower limit selected from any of 10 MPa, 20 MPa, and 30 MPa, to an upper limit selected from any of 700 MPa, 800 MPa, and 1,000 MPa, where any lower limit may be paired with any upper limit.

Polymer compositions in accordance with the present disclosure may have a hardness Shore D according to ASTM D2240 in a range having a lower limit selected from any of 10 Shore D, 15 Shore D and 20 Shore D, to an upper limit selected from 30 Shore D, 40 Shore D and 50 Shore D, where any lower limit may be paired with any upper limit.

Polymer compositions in accordance with the present disclosure may have a hardness Shore A according to ASTM D2240 in a range having a lower limit selected from any of 30 Shore A, 40 Shore A and 50 Shore A, to an upper limit selected from 60 Shore A, 70 Shore A and 80 Shore A, where any lower limit may be paired with any upper limit.

In one or more embodiments, polymer compositions may have an IZOD impact strength at 23° C. according to ASTM D256 Method A that ranges from 1 J/m to no break (NB).

Applications

In one or more embodiments, polymer compositions can be used in various article manufacturing processes, including extrusion molding, injection molding, thermoforming, cast film extrusion, blown film extrusion, foaming, extrusion blow-molding, ISBM (Injection Stretched Blow-Molding), 3D printing, rotomolding, pultrusion, and the like, to produce manufactured articles.

Tactile polymer compositions may be used in a varied number of applications that may include monolayer and multilayer blow molded packages; rotational molded and injected parts, components and toys; furniture coverings, furniture and other soft touch materials; rotational molded and injected mannequins; automotive parts, including panels and details on doors; blown molded and extruded tubing; extruded sheets and films; flexible films and coatings, and the like.

In one or more embodiments, tactile polymer compositions in accordance with the present disclosure may be processed to generate monolayer or multilayer films and articles. Multilayer articles may include one or more layers containing a tactile polymer composition. In one or more embodiments, articles generated by polymer compositions in accordance with the present disclosure include multilayer articles having at least two layers, wherein the tactile polymer composition may be present in the outermost layer. In one or more embodiments, the tactile polymer composition may be present in the outermost layer and a polyolefin, such as polyethylene or polypropylene and mixtures thereof, may be present in the inner layer.

In one of more embodiments, multilayer articles generated by the polymer compositions may have at least three layers. For example, articles may include multilayer packaging having an outermost layer that may provide structure and appearance, an intermediate layer to provide reinforcement or otherwise modify the feel or structure of the article, and an internal layer that provides chemical resistance or compatibility for the package contents. In some embodiments, tactile polymer compositions may be included in the outermost layer that enhances the appearance and touch of a manufactured article. In some embodiments, tactile polymer compositions may be included in an interior layer to provide a softer foam-like feel to the article, and a softer overall appearance.

In one or more embodiments, the monolayer or multilayer articles are blow molded articles, such as blow molded containers or packages for consumer goods or healthcare products.

In one or more embodiments, a multilayer package containing two or more layers may have an outer layer produced with a tactile polymer composition in accordance with the present disclosure at a percent by weight (wt %) of the package that ranges from a lower limit selected from any of 0.1 wt %, 5 wt %, and 10 wt %, to an upper limit selected from any of 20 wt %, 50 wt %, and 90 wt %. In some embodiments, a multilayer package containing two or more layers may have a layer produced with a tactile polymer composition and at least an inner layer of other polymer, such as a polyolefin. In some embodiments, a multilayer package containing two or more layers may have a layer produced with a tactile polymer composition, and an inner layer formed from a barrier material, such as a polyamide, polyacrylamide, ethylene vinyl alcohol, and other barrier polymers.

EXAMPLES

The following examples are merely illustrative, and should not be interpreted as limiting the scope of the present disclosure.

Example 1

In this example, polymer formulations are prepared in accordance with the present disclosure from a mixture of HDPE (high density polyethylene) resin or polypropylene and an EVA rubber, all of which are commercially available resins by Braskem. Formulations are shown below in Table 1. Properties of the polyolefins are shown in Table 2, while assayed chemical physical properties of the formulations are shown below in Table 3.

TABLE 1

Sample formulations for Example 1

| Formulation | HDPE (wt %) | EVA (wt %) | Method |
|---|---|---|---|
| 1 | HDPE-BS002W (50%) | EVA Rubber-VA4018R (50%) | Preformed EVA Rubber and HDPE melt blended in a single extruder |
| 2 | HDPE-GF4950HS (50%) | EVA Rubber-VA4018R (50%) | Preformed EVA Rubber and HDPE melt blended in a single extruder |
| 3 | HDPE-BS002W (50%) | EVA Rubber (50%) | Mix of all the components of EVA Rubber together with HDPE in the same extrusion process |
| 4 | PP-CP360H (50%) | EVA Rubber-VA4018R (50%) | Preformed EVA Rubber and PP melt blended in a single extruder |

TABLE 2

Properties of polyolefins used in formulations of Example 1

| Properties | Standard | HDPE-BS002W | HDPE-GF4950HS | PP-CP360H | Unity |
|---|---|---|---|---|---|
| Melt Flow Index (190° C./2.16 kg for samples with HDPE and 230° C./2.16 kg for samples with PP) | ASTM D 1238 | 0.33 | 0.21 | 34 | g/10 min |
| Density | ASTM D 792 | 0.959 | 0.951 | 0.905 | g/cm$^3$ |
| Mn | GPC | 15.27 | 10.57 | 51.4 | kDa |
| Mw | GPC | 181.51 | 193.14 | 196.6 | kDa |
| Mz | GPC | 1026.9 | 1038.4 | 460.4 | kDa |
| Mw/Mn | GPC | 11.89 | 18.27 | 3.82 | — |
| LMW fraction density | ASTM D 792 | 50 | 50 | | g/cm$^3$ |
| LMW fraction melt flow index (190° C./5 kg) | ASTM D 1238 | 0.970 | 0.960 | | g/10 min |
| LMW:HMW weight ratio | — | 60:40 | 60:40 | — | wt %/wt % |

TABLE 2

Physical properties for sample formulations in Example 1

| Properties | Standard | Formulations | | | | units |
| --- | --- | --- | --- | --- | --- | --- |
| | | 1 | 2 | 3 | 4 | |
| $I_2$ (190° C./2.16 kg for samples with HDPE and 230° C./2.16 kg for samples with PP)) | ASTM D 1238 | 0.79 | 0.61 | 0.76 | 28 | g/10 min |
| Acetate content | ASTM D5594 | 8.7 | 9.1 | 8.8 | 8.8 | % |
| Complex viscosity at 0.10 rad/s | ASTM D 4440 | 21420.8 | 30711.4 | 23450.1 | 1480 | Pa · s |
| Complex viscosity at 100 rad/s | ASTM D 4440 | 884.2 | 1009.6 | 986.4 | 517 | Pa · s |
| Hardness Shore D | ASTM D 2240 | 32 | 38 | 31 | 26 | Shore D |
| IZOD impact resistance 23° C. | ASTM D 256A | NB | NB | NB | NB | J/m |

Although the preceding description is described herein with reference to particular means, materials and embodiments, it is not intended to be limited to the particulars disclosed herein; rather, it extends to all functionally equivalent structures, methods and uses, such as are within the scope of the appended claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed:

1. A composition, comprising:
a polymer composition prepared from a mixture of polyolefin and a rubber component, wherein the mixture is prepared in a post-reactor process;
wherein the polymer composition has a complex viscosity at 0.10 rad/s according to ASTM D4440 in the range of 1,000 to 40,000 Pa·s;
wherein the polyolefin comprises polyethylene, wherein the polyethylene is one or more selected from a group consisting of ethylene homopolymer, and ethylene copolymer;
wherein the polyethylene has a high load melt index (HLMI) according to ASTM D1238 at 190° C./21.6 kg in a range of 1 g/10 min to 80 g/10 min; and
wherein the polyethylene has a melt flow index according to ASTM D1238 at 190° C./2.16 kg ($I_2$) in a range of 0.01 g/10 min to 60 g/10 min.

2. The composition of claim 1, wherein the polyolefin has a Mw/Mn in a range of 1 to 50.

3. The composition of claim 1, wherein the polyolefin has a number average molecular weight ($M_n$) in a range of 2 kDa to 60 kDa.

4. The composition of claim 1, wherein the polyolefin has a z-average molecular weight ($M_z$) in a range of 50 kDa to 1,500 kDa.

5. The composition of claim 1, wherein the polyolefin has a weight average molecular weight ($M_w$) in a range of 40 kDa to 600 kDa.

6. The composition of claim 1, wherein the polyethylene has a density as determined according to ASTM D792 in a range of 0.910 g/cm3 to 0.970 g/cm3.

7. The composition of claim 1, wherein the polyethylene has a secant modulus at 1% according to ASTM D882 in a range of 50 MPa to 3,000 MPa.

8. The composition of claim 1, wherein the polyethylene has a breaking strength according to ASTM D882 in a range of 10 MPa to 600 MPa.

9. The composition of claim 1, wherein the polyethylene has an IZOD impact strength at 23° C. according to ASTM D256 Method A that ranges from 1 J/m to no break (NB).

10. A composition, comprising:
a polymer composition prepared from a mixture of polyolefin and a rubber component, wherein the mixture is prepared in a post-reactor process;
wherein the polymer composition has a complex viscosity at 0.10 rad/s according to ASTM D4440 in the range of 1,000 to 40,000 Pa·s;
wherein the polyolefin comprises polypropylene;
wherein the polypropylene has a fraction of solubles in xylene according to ASTM D5492 in a range of 1.0 wt % to 46 wt %; and
wherein the polypropylene has a crystallinity according to ASTM D3417 in a range of 30% to 70%.

11. The composition of claim 10, wherein the polypropylene has melt flow index (MFI) according to ASTM D1238 at 230° C./2.16 kg in a range of 0.1 g/10 min to 1,500 g/10 min.

12. The composition of claim 10, wherein the polypropylene has a density according to ASTM D792 in a range of 0.85 g/cm3 to 0.95 g/cm3.

13. The composition of claim 10, wherein the polypropylene is a heterophasic copolymer.

14. The composition of claim 13, wherein the heterophasic copolymer comprises a rubber phase wherein the rubber phase has an ethylene content according to ASTM D7399 in a range of 30 to 70 percent by weight of the rubber phase.

15. The composition of claim 1, wherein the polyolefin has a monomodal molecular weight distribution peak.

16. The composition of claim 1, wherein the polyolefin is multimodal and comprises a low molecular weight (LMW) fraction and a high molecular weight (HMW) fraction, wherein the weight ratio of the LMW fraction and the HMW fraction is in the range from 20:80 to 80:20.

17. The composition of claim 1, wherein the rubber component comprises an ethylene vinyl acetate rubber.

18. The composition of claim 17, wherein the ethylene vinyl acetate rubber comprises a mixture of ethylene vinyl acetate, ethylene alpha-olefin polymer, polyorganosiloxane, plasticizer, and rubber.

19. The composition of claim 1, wherein the rubber component comprises a mixture of thermoplastic ethylene vinyl acetate and rubber.

20. The composition of claim 19, wherein the polyolefin is present at 50 wt % to 99 wt %, the thermoplastic ethylene vinyl acetate is present at 20 wt % to 50 wt %, and the rubber is present at 20 wt % to 30 wt %.

21. The composition of claim 1, wherein the rubber component comprises a thermoplastic elastomer.

22. The composition of claim 21, wherein the polyolefin is present at 10 wt % to 50 wt % and the thermoplastic elastomer is present at 50 wt % to 90 wt %.

23. The composition of claim 1, wherein the polymer composition has a breaking strength according to ASTM D882 in a range of 20 MPa to 800 MPa.

24. The composition of claim 1, wherein the polymer composition has an IZOD impact strength at 23° C. according to ASTM D256 Method A that ranges from 1 J/m to no break (NB).

25. The composition of claim 1, wherein the polymer composition has a Shore D Hardness according to ASTM D2240 that ranges from 10 to 50 Shore D.

26. The composition of claim 1, wherein the polymer composition has a Shore A Hardness according to ASTM D2240 that ranges from 30 to 80 Shore A.

27. The composition of claim 1, wherein the polymer composition has a complex viscosity at 100 rad/s according to ASTM D4440 in the range of 300 to 1,500 Pa·s.

28. An article prepared from the composition of claim 1.

29. A multilayer article, comprising:
two or more layers, wherein at least one of the layers comprises a polymer composition prepared from a mixture of polyolefin and a rubber component;
wherein the polymer composition has a complex viscosity at 0.10 rad/s according to ASTM D4440 in the range of 1,000 to 40,000 Pa·s;
wherein the polyolefin comprises polyethylene, wherein the polyethylene is one or more selected from a group consisting of ethylene homopolymer, and ethylene copolymer;
wherein the polyethylene has a high load melt index (HLMI) according to ASTM D1238 at 190° C./21.6 kg in a range of 1 g/10 min to 80 g/10 min; and
wherein the polyethylene has a melt flow index according to ASTM D1238 at 190° C./2.16 kg ($I_2$) in a range of 0.01 g/10 min to 60 g/10 min.

30. The multilayer article of claim 29, wherein the layer comprising the tactile polymer is the outermost layer of the multilayer article.

31. A blow molded multilayer article, comprising:
two or more layers, wherein the outermost layer comprises a polymer composition prepared from a mixture of polyolefin and a rubber component;
wherein the polymer composition has a complex viscosity at 0.10 rad/s according to ASTM D4440 in the range of 10,000 to 40,000 Pa·s;
wherein the polyolefin comprises polyethylene, wherein the polyethylene is one or more selected from a group consisting of ethylene homopolymer, and ethylene copolymer;
wherein the polyethylene has a high load melt index (HLMI) according to ASTM D1238 at 190° C./21.6 kg in a range of 1 g/10 min to 80 g/10 min; and
wherein the polyethylene has a melt flow index according to ASTM D1238 at 190° C./2.16 kg ($I_2$) in a range of 0.01 g/10 min to 60 g/10 min.

32. A method, comprising
preparing a polymer composition by combining a polyolefin and a rubber component by melt mixture to produce a blended polymer composition;
wherein the polymer composition has a complex viscosity at 0.10 rad/s according to ASTM D4440 in the range of 1,000 to 40,000 Pa·s;
wherein the polyolefin comprises polyethylene, wherein the polyethylene is one or more selected from a group consisting of ethylene homopolymer, and ethylene copolymer;
wherein the polyethylene has a high load melt index (HLMI) according to ASTM D1238 at 190° C./21.6 kg in a range of 1 g/10 min to 80 g/10 min; and
wherein the polyethylene has a melt flow index according to ASTM D1238 at 190° C./2.16 kg ($I_2$) in a range of 0.01 g/10 min to 60 g/10 min.

33. The method of claim 32, wherein combining comprises adding the polyolefin and the rubber component into an extruder.

* * * * *